(12) United States Patent
Lovett et al.

(10) Patent No.: US 10,094,289 B2
(45) Date of Patent: Oct. 9, 2018

(54) CAVITY SWIRL FUEL INJECTOR FOR AN AUGMENTOR SECTION OF A GAS TURBINE ENGINE

(71) Applicant: United Technologies Corporation, Hartford, CT (US)

(72) Inventors: Jeffery A. Lovett, Tolland, CT (US); Benjamin D. Bellows, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 771 days.

(21) Appl. No.: 13/936,876

(22) Filed: Jul. 8, 2013

(65) Prior Publication Data

US 2014/0338357 A1      Nov. 20, 2014

Related U.S. Application Data

(60) Provisional application No. 61/697,650, filed on Sep. 6, 2012, provisional application No. 61/773,600, filed on Mar. 6, 2013.

(51) Int. Cl.

| | |
|---|---|
| *F02K 3/10* | (2006.01) |
| *F02C 7/22* | (2006.01) |
| *F23R 3/60* | (2006.01) |
| *F23R 3/12* | (2006.01) |
| *F23R 3/28* | (2006.01) |
| *F23R 3/20* | (2006.01) |

(52) U.S. Cl.
CPC ............... *F02C 7/22* (2013.01); *F02K 3/10* (2013.01); *F23R 3/12* (2013.01); *F23R 3/20* (2013.01); *F23R 3/28* (2013.01); *F23R 3/283* (2013.01); *F23R 3/286* (2013.01); *F23R 3/60* (2013.01); *F05D 2240/36* (2013.01)

(58) Field of Classification Search
CPC ........ F02K 3/10; F23R 3/12; F23R 3/20; F23R 3/283; F23R 3/28; F23R 3/286; F23R 3/60; F02C 7/22
See application file for complete search history.

(56) References Cited

U.S. PATENT DOCUMENTS

| | | | | |
|---|---|---|---|---|
| 2,946,185 | A | * 7/1960 | Bayer | F02C 7/222 239/429 |
| 3,719,042 | A | * 3/1973 | Chamberlain | F23R 3/20 239/429 |
| 4,203,285 | A | 5/1980 | Hanloser et al. | |
| 4,454,711 | A | * 6/1984 | Ben-Porat | F23R 3/10 60/748 |
| 4,461,146 | A | 7/1984 | DuBell | |
| 4,850,196 | A | * 7/1989 | Scalzo | B05B 7/0807 60/740 |
| 4,989,407 | A | 2/1991 | Grant, Jr. | |
| 5,203,796 | A | * 4/1993 | Washam | F23R 3/20 60/737 |
| 5,297,391 | A | * 3/1994 | Roche | F23R 3/20 60/262 |

(Continued)

*Primary Examiner* — Gerald L Sung
*Assistant Examiner* — Scott Wathour
(74) *Attorney, Agent, or Firm* — O'Shea Getz P.C.

(57) ABSTRACT

A fuel injection system for a gas turbine engine includes a fuel nozzle with a fuel injection aperture to inject a fuel jet and a multiple of airflow passages in the fuel nozzle to communicate a multiple of air streams to interact with the fuel jet.

4 Claims, 11 Drawing Sheets

(56) References Cited

U.S. PATENT DOCUMENTS

| | | | | |
|---|---|---|---|---|
| 5,385,015 | A | * | 1/1995 | Clements .................. F23R 3/20 60/39.826 |
| 6,199,367 | B1 | * | 3/2001 | Howell ................... F23D 11/24 239/402.5 |
| 6,276,141 | B1 | * | 8/2001 | Pelletier ................ F23D 11/107 60/740 |
| 7,013,635 | B2 | | 3/2006 | Cohen et al. |
| 7,568,346 | B2 | | 8/2009 | Roberts et al. |
| 7,647,775 | B2 | | 1/2010 | Muldoon et al. |
| 8,011,188 | B2 | | 9/2011 | Woltmann et al. |
| 2007/0006590 | A1 | * | 1/2007 | Muldoon .................. F23R 3/20 60/761 |
| 2010/0269508 | A1 | * | 10/2010 | Saito ........................ F23R 3/14 60/748 |
| 2011/0005229 | A1 | * | 1/2011 | Venkataraman ........ F23D 11/38 60/737 |
| 2011/0296839 | A1 | * | 12/2011 | Van Nieuwenhuizen .................. F23R 3/346 60/737 |

* cited by examiner

CAVITY SWIRL FUEL INJECTOR FOR AN AUGMENTOR SECTION OF A GAS TURBINE ENGINE

Applicant hereby claims priority to U.S. Patent Application No. 61/697,650 filed Sep. 6, 2012, and U.S. Patent Application No. 61/773,600 filed Mar. 6, 2013, the disclosures of which are herein incorporated by reference.

STATEMENT REGARDING FEDERALLY SPONSORED RESEARCH OR DEVELOPMENT

This disclosure was made with Government support under F33615-03-D-2354-0011 awarded by The United States Air Force Research Laboratory. The Government has certain rights in this invention.

BACKGROUND

The present disclosure relates to gas turbine engines, and more particularly to a fuel injector therefor.

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase the thrust. The increase in thrust is produced when fuel is injected into the core exhaust gases downstream of the turbine section and burned with the oxygen contained thereinto generate a second combustion.

Typically, the injected fuel is controlled to penetrate relatively deep into the core exhaust gases to increase augmentor efficiency as well as the magnitude of the supplemental engine thrust. Such deep fuel penetration, however, is dependent on the fuel flow rate which may negatively impact flame stability and increase augmentor instabilities commonly called "screech".

Traditional fuel flow distribution control in the augmentor section may include additional fuel circuits, additional injection sites, pressure-acting valves, and/or more complicated injectors that have small passages by necessity; all of which may introduce complexity and cost.

SUMMARY

A fuel injection system for a gas turbine engine according to one disclosed non-limiting embodiment of the present disclosure includes a fuel nozzle with a fuel injection aperture to inject a fuel jet and a multiple of airflow passages to generate a multiple of air streams that interact with the fuel jet.

A further embodiment of the present disclosure includes, wherein the multiple of air streams enhance atomization of the fuel jet.

A further embodiment of any of the foregoing embodiments of the present disclosure includes, wherein the multiple of air streams generate counter-rotating vortices.

A further embodiment of any of the foregoing embodiments of the present disclosure includes a first wall transverse to a bottom wall to at least partially define a fuel injector cavity, a first airflow passage and a second airflow passage of the multiple of airflow passages extend through the first wall, the fuel injection passage extends through the bottom wall.

A further embodiment of any of the foregoing embodiments of the present disclosure includes, wherein the fuel injection passage extends through a bottom wall of a fuel injector cavity, the fuel injection passage offset from a central nozzle axis of the fuel nozzle.

A further embodiment of any of the foregoing embodiments of the present disclosure includes, wherein the fuel nozzle is U-shaped in cross-section.

A further embodiment of any of the foregoing embodiments of the present disclosure includes, wherein the fuel injection passage extends through a bottom wall of a fuel injector cavity.

A further embodiment of any of the foregoing embodiments of the present disclosure includes, wherein the multiple of air streams generate counter-rotating vortices that impinge upon a fuel jet from the fuel injection aperture.

A further embodiment of any of the foregoing embodiments of the present disclosure includes a wear block, the fuel nozzle received within the wear block.

A further embodiment of any of the foregoing embodiments of the present disclosure includes, wherein the wear block is biased relative to the fuel nozzle.

A further embodiment of any of the foregoing embodiments of the present disclosure includes, wherein the fuel nozzle is mounted to a fuel conduit of a spraybar.

A further embodiment of any of the foregoing embodiments of the present disclosure includes, wherein the spraybar is mounted within an augmentor vane.

A further embodiment of any of the foregoing embodiments of the present disclosure includes, wherein the spraybar include a first and second fuel conduit.

An augmentor section for a gas turbine engine according to another disclosed non-limiting embodiment of the present disclosure includes an augmentor vane within an exhaust gas path of the gas turbine engine. A spraybar is mounted within the augmentor vane and a fuel injector is mounted to the spraybar to communicate through the augmentor vane, the fuel injector generates counter-rotating vortices.

A further embodiment of any of the foregoing embodiments of the present disclosure includes, wherein the fuel nozzle includes a fuel injection aperture, a first airflow passage and a second airflow passage, the first airflow passage and the second airflow passage transverse to the fuel injection passage.

A further embodiment of any of the foregoing embodiments of the present disclosure includes, wherein the first airflow passage and the second airflow passage are arranged upstream of the fuel injection aperture with respect to an exhaust gas path.

A further embodiment of any of the foregoing embodiments of the present disclosure includes, wherein the fuel injector is arranged about ninety degrees with respect to an exhaust gas path.

A method of injecting fuel according to another disclosed non-limiting embodiment of the present disclosure includes directing a fuel jet along an axis; directing a first airflow vortices that impinges an edge of the fuel jet and rotates counterclockwise; and directing a second airflow vortices that impinges an edge of the fuel jet and rotates clockwise.

A further embodiment of any of the foregoing embodiments of the present disclosure includes directing the fuel jet through an augmentor vane transverse to an exhaust gas flow.

A further embodiment of any of the foregoing embodiments of the present disclosure includes directing the first and second airflow vortices downstream with respect to an exhaust gas flow.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
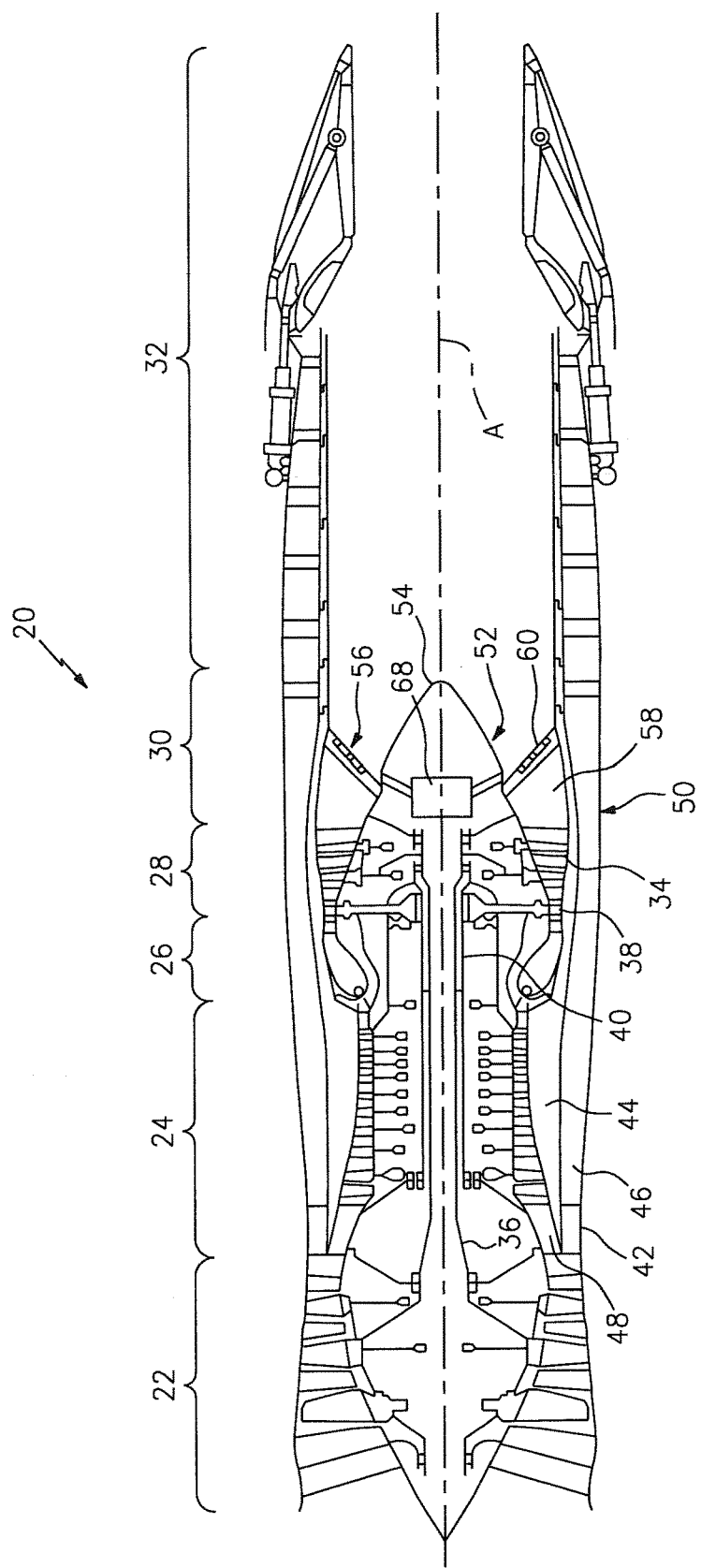
FIG. 1 is a general schematic view of an exemplary gas turbine engine embodiment for use with the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26, a turbine section 28, an augmentor section 30 and a nozzle section 32. The sections are defined along a central longitudinal engine axis A. Although depicted as an augmented low bypass gas turbine engine in the disclosed non-limiting embodiment, it should be understood that the concepts described herein are applicable to other gas turbine engines including geared architecture engines, direct drive turbofans, turbojet, turboshaft, ramjet and other engine architectures.

The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer engine case structure 42 and an inner engine structure 44 define a generally annular secondary airflow path 46 around a primary airflow path 48 of the engine core.

It should be understood that various structure within the engine may define the outer engine case structure 42 and the inner engine case structure 44 which essentially define an exoskeleton to support the core engine therein.

Air that enters the fan section 22 is divided between a core flow through the primary airflow path 48 and a secondary airflow through the secondary airflow path 46. The core flow passes through the combustor section 26, the turbine section 28, then the augmentor section 30 where fuel may be selectively injected and burned to generate additional thrust through the nozzle section 32. The secondary airflow may be utilized for a multiple of purposes to include, for example, cooling and pressurization. The secondary airflow as defined herein is any flow different than the primary combustion gas exhaust airflow. The secondary airflow passes through an annulus defined by the outer engine case structure 42 and the inner engine structure 44 then may be at least partially injected into the primary airflow path 48 adjacent the augmentor section 30 and the nozzle section 32.

Figure 2:
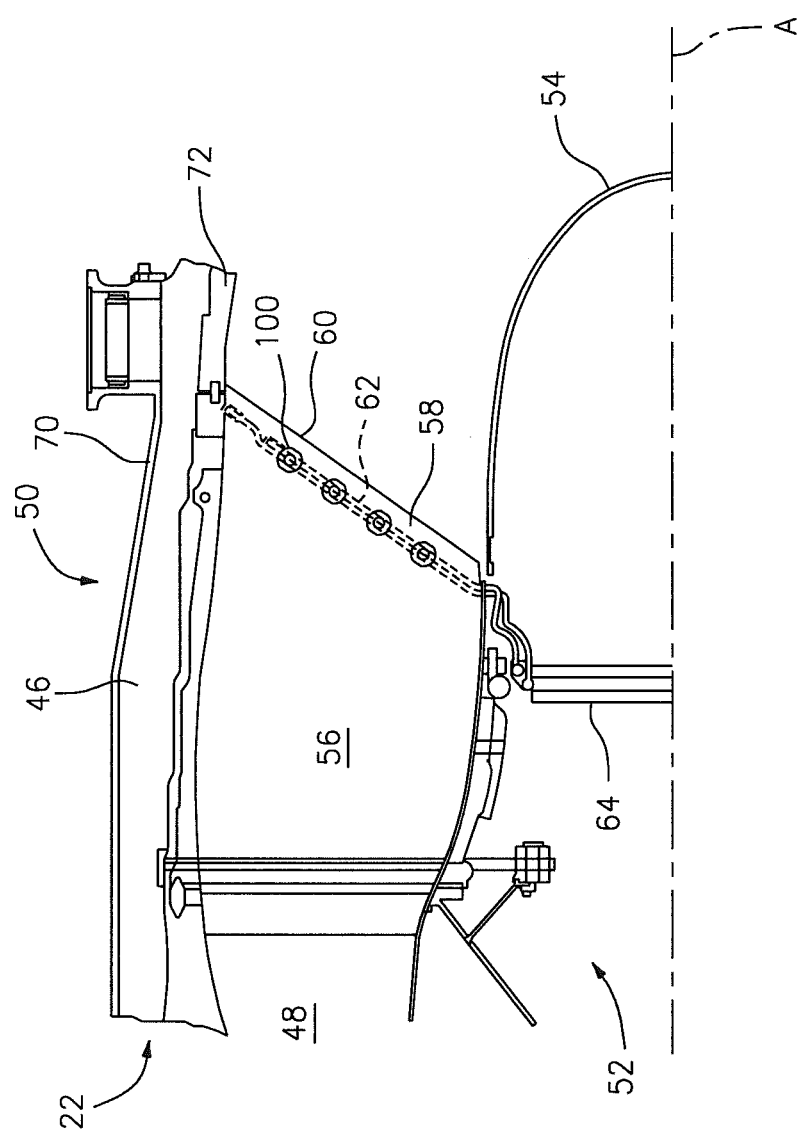
FIG. 2 is an expanded sectional view of an augmentor vane of the augmentor section.

With reference to FIG. 2, the augmentor section 30 generally includes a turbine exhaust case (TEC) 50 and a center body 52 with a conically shaped tail cone 54. The TEC 50 generally includes an outer case 70 of the outer engine case structure 42 and a concentrically spaced inner liner 72 that operates as a heat shield to protect the outer case 70 from the exhaust gas flow in the flow path. Air discharged from, for example, the fan section 22 is communicated through the secondary airflow path 46 defined in part by the outer case 70 and the inner liner 72.

Circumferentially arrayed augmentor vanes 56 extend generally radially between the center body 52 and the TEC 50. Each of the augmentor vanes 56 have circumferentially opposite first and second walls 58, 60 through which secondary airflow is received from the fan duct 46 to cool and pressurize the augmentor vanes 56.

Figure 3:
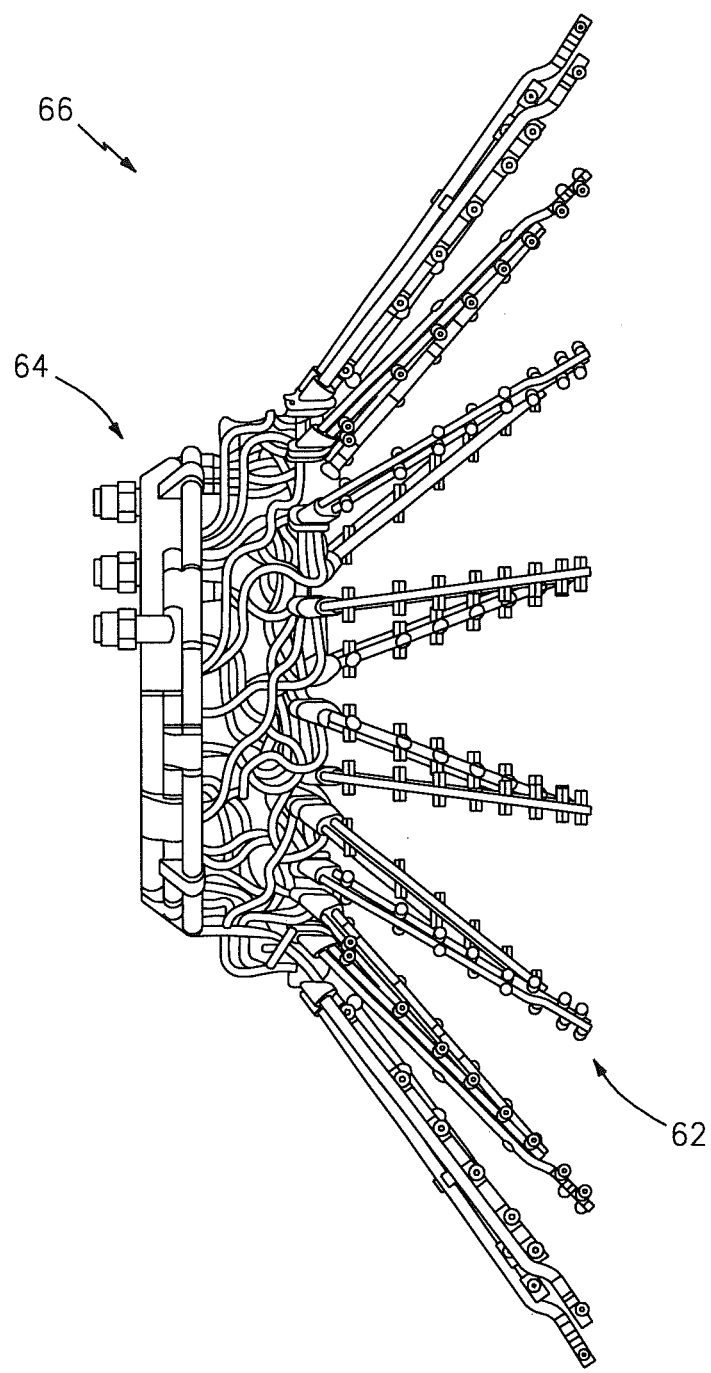
FIG. 3 is a side view of an augmentor fuel injection system.
Figure 4:
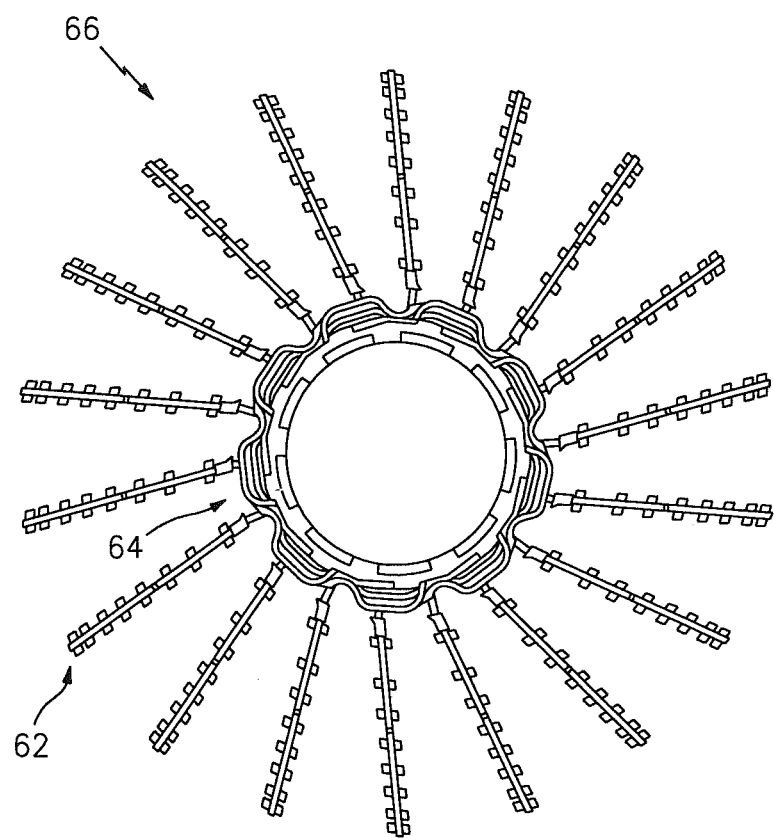
FIG. 4 is a rear view of an augmentor fuel injection system.

Each or particular augmentor vanes 56 contain a spraybar 62 that extends from a fuel manifold 64 of an augmentor fuel injection system 66 (also shown in FIGS. 3 and 4). The fuel manifold 64 may be located radially inboard such that the spraybars 62 extend radially outward, as shown, or the fuel manifold can alternatively or additionally be placed radially outboard such that the spraybars extend radially inward. The spraybars 62 spray fuel through the circumferentially opposite first and second walls 58, 60 of the augmentor vanes 56 at generally right angles directly into the exhaust gas flow downstream of the turbine section 28. An igniter or pilot system is operated to ignite and maintain ignition of the fuel sprayed from spraybars 62.

Figure 5:
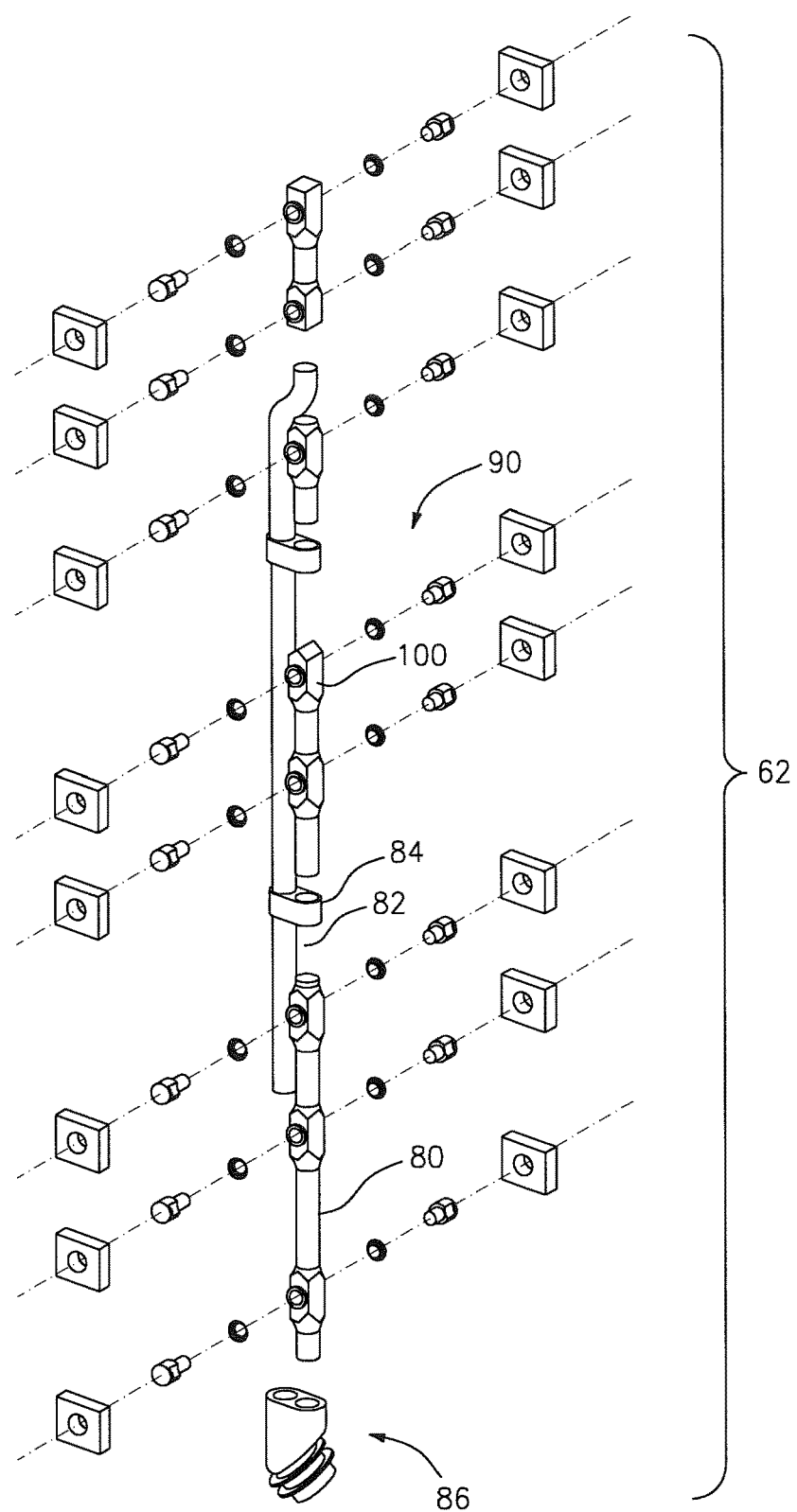
FIG. 5 is an exploded view of a spraybar of the augmentor fuel injection system.

With reference to FIG. 5, each spraybar 62 in the disclosed non-limiting embodiment is a dual fuel conduit spray bar with a first fuel conduit 80 and a second fuel conduit 82 to provide a multi-zone augmentor section 30. The fuel conduits 80, 82 are generally secured to each other by connectors 84 and a spraybar block 86. The spraybar block 86 connects the fuel conduits 80, 82 to the fuel manifold 64 and mounts the spraybar 62 with respect to the center body 52 and an associated augmentor vane 56.

Figure 6:
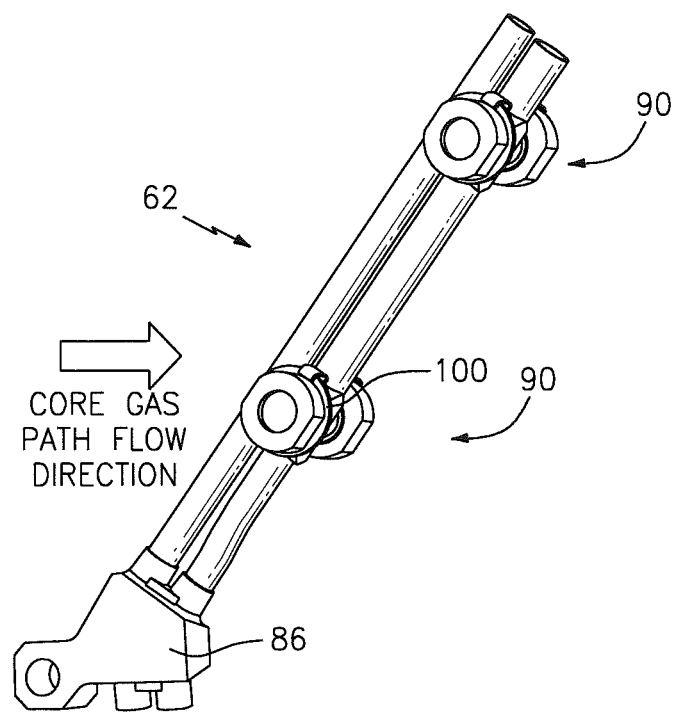
FIG. 6 is a side perspective view of a spraybar of the augmentor fuel injection system.

With reference to FIG. 6, each of the spraybars 62 supports a multiple of fuel injectors 90 that discharge an associated jet of fuel. Although only a single fuel injector 90 will be described in detail, it should be appreciated that the other fuel injectors 90 are generally alike. The multiple of fuel injectors 90 are spaced along the spraybars 62 to spray fuel into the exhaust gas stream downstream of the turbine section 24 to mix with oxygen and ignited to generate a second combustion and increased thrust.

Figure 7:
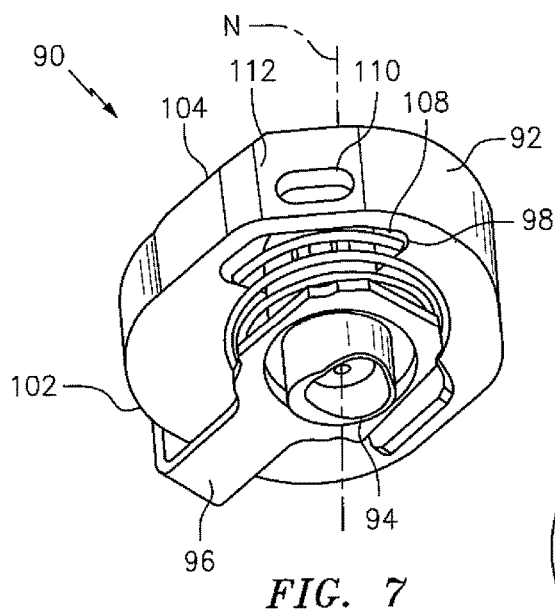
FIG. 7 is an expanded perspective view of a fuel injector.
Figure 8:
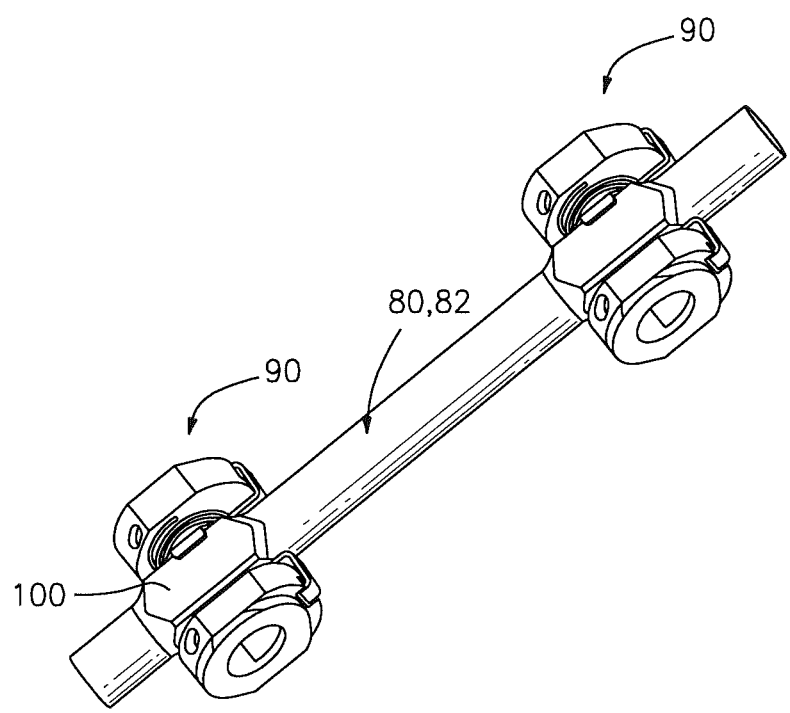
FIG. 8 is a front perspective view of a spraybar of the augmentor fuel injection system.

With reference to FIG. 7 one disclosed non-limiting embodiment of the fuel injectors 90 generally includes a wear block 92, a nozzle 94, a retainer 96 and a spring 98. Exemplary nozzles 94 may be manufactured of nickel-based superalloy. The wear block 92 may be manufactured of a material such as an electrographitic material that wears relative to the adjacent augmentor vane 56 and nozzle 94. In the disclosed non-limiting embodiment, each nozzle 94 may be integrated, e.g., brazed, to an associated boss 100 (best seen in FIG. 8) of the associated fuel conduit 80, 82. The wear block 92 may be mounted for reciprocal motion along a nozzle axis N by the spring 98 that is compressed between an inboard face 102 of the wear block 92 and the retainer 96. The retainer 96 rotationally positions the wear block 92 with respect to the nozzle 94.

The spring 98 operates to bias the wear block 92 away from the associated fuel conduit 80, 82 so that an outboard face 104 of the wear block 92 is maintained in contact with an inner surface of the associated first or second walls 58, 60 of the augmentor vanes 56. In normal operation, this position may be generally intermediate in the block range of reciprocal motion, to accommodate wear, operational deflections (e.g., differential thermal expansion or differential deformation due to pressure or g-loading), vibration, and the like so as to maintain an effective air seal between the spraybar nozzle 94 and the associated first or second walls 58, 60 of the augmentor vanes 56 or trailing edge box. Over time, wear and deformation of the wear blocks 92 further accommodate such differential thermal expansion and manufacturing stack tolerances.

Figure 9:
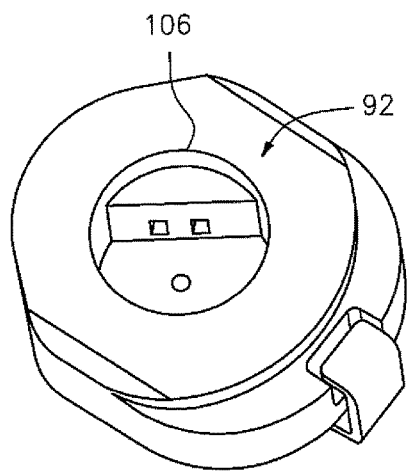
FIG. 9 is an expanded top view of a cavity vortex swirl fuel injector.
Figure 10:
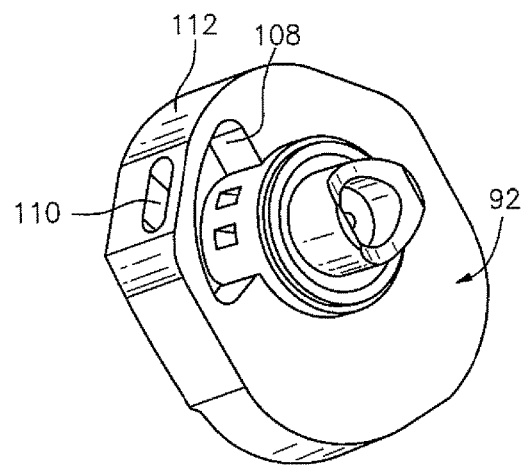
FIG. 10 is an expanded bottom view of the cavity vortex swirl fuel injector.

The wear block 92 generally includes a nozzle aperture 106 along a fuel injector centerline axis N within which the nozzle 94 is received (also shown in FIG. 9). The wear block 92 also includes an inboard face airflow passage 108 that communicates with the nozzle aperture 106 and a lateral airflow window 110 that increases secondary airflow into the inboard face airflow passage 108 (also shown in FIG. 10). That is, the lateral airflow window 110 is transverse to the nozzle aperture 106 and located through a lateral face 112 between the outboard face 104 and the inboard face 102 to receive secondary airflow from within the augmentor vane 56.

Figure 11:
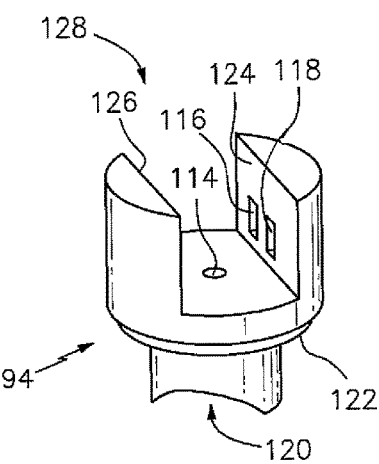
FIG. 11 is a perspective view of a fuel nozzle of the cavity vortex swirl fuel injector.

With reference to FIG. 11, the nozzle 94 generally includes a fuel aperture 114, a first airflow passage 116 and a second airflow passage 118. The fuel aperture 114 operates to discharge a jet of fuel from a fuel passage 120 that passes through the nozzle 94 for communication with one of the associated fuel conduits 80, 82. The fuel aperture 114 is located through a bottom surface 122 between sidewalls 124, 126 of a fuel injector cavity 128. The nozzle 94 is generally U-shaped to define a slot fuel injector cavity 128 arranged generally perpendicular to the core gas path (FIG. 6). It should be appreciated that various other shapes may alternatively be utilized. The fuel injector cavity 128 may be sized and arranged to a given air stream velocity and fuel velocity that considerably enhances stripping of fine droplets to improve flame stability.

Figure 12:
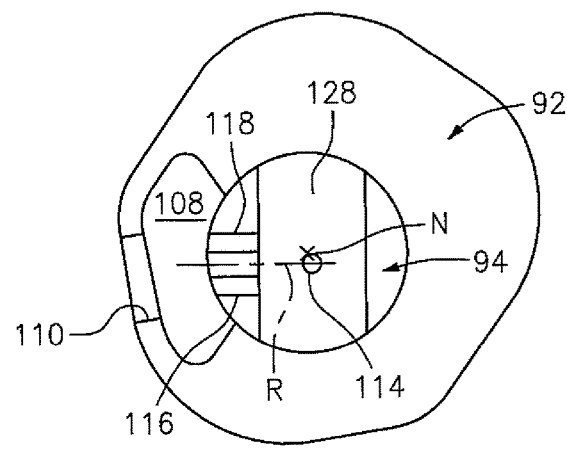
FIG. 12 is a top schematic view of the cavity vortex swirl fuel injector.

With reference to FIG. 12 in one disclosed non-limiting embodiment, the fuel aperture 114 is located off the fuel injector centerline axis N yet between the airflow passages 116, 118 along a radial axis R. The airflow passages 116, 118 may be slots arranged generally parallel to the fuel injector centerline axis N. The airflow passages 116, 118 are located through the side surface 124 in communication with the inboard face airflow passage 108 to receive secondary airflow from within the augmentor vane 56. Side surface 124 in the disclosed non-limited embodiment is the upstream surface with respect to core gas path direction (FIG. 6).

Figure 13:
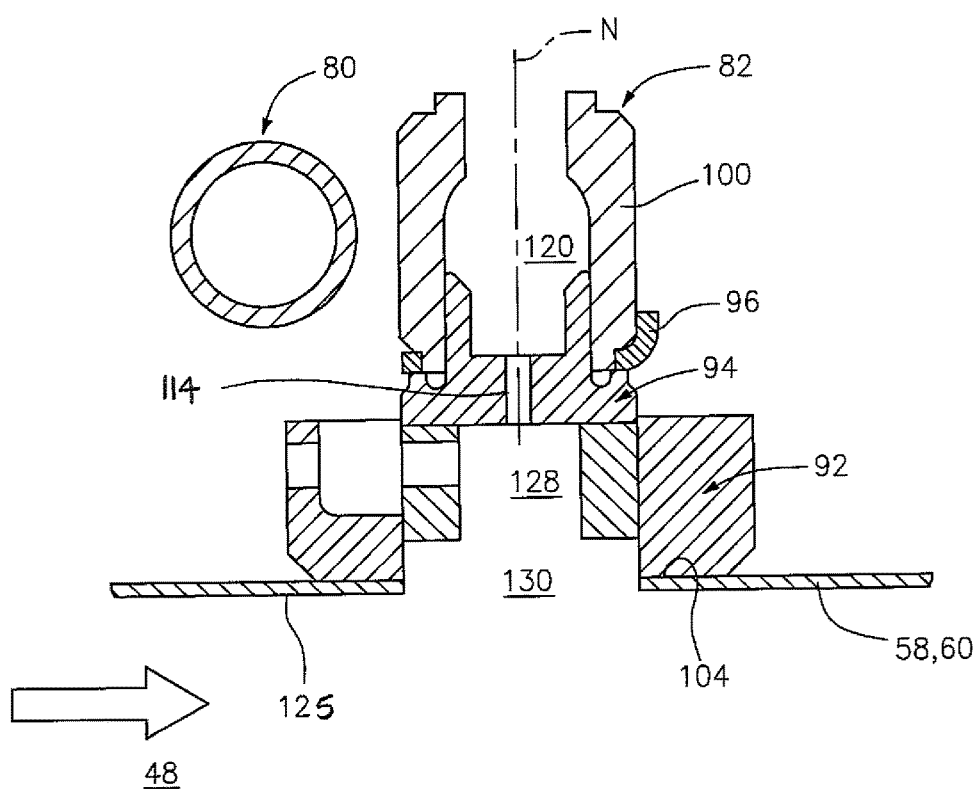
FIG. 13 is a sectional view of the cavity vortex swirl fuel injector.

With reference to FIG. 13, the fuel aperture 114 injects fuel from the respective fuel delivery fuel conduit 80, 82 into the fuel injector cavity 128 and thence through an augmentor vane aperture 130 through the respective first or second walls 58, 60 of the augmentor vanes 56 when the augmentor is operated.

An exterior surface 125 of the augmentor vanes 56 interacts with the primary airflow path 48 of the augmentor section 30. That is, the interior of the augmentor vane 56 receives secondary airflow while the augmentor vane 56 itself is positioned within the exhaust gas path downstream of the turbine section 28. A pressure differential between the exhaust gases and the secondary airflow within the augmentor vanes 56 directs secondary airflow into the inboard face airflow passage 108 and the lateral airflow window 110 thence through the airflow passages 116, 118, into the fuel injector cavity 128 thence the exhaust gas path.

Figure 14:
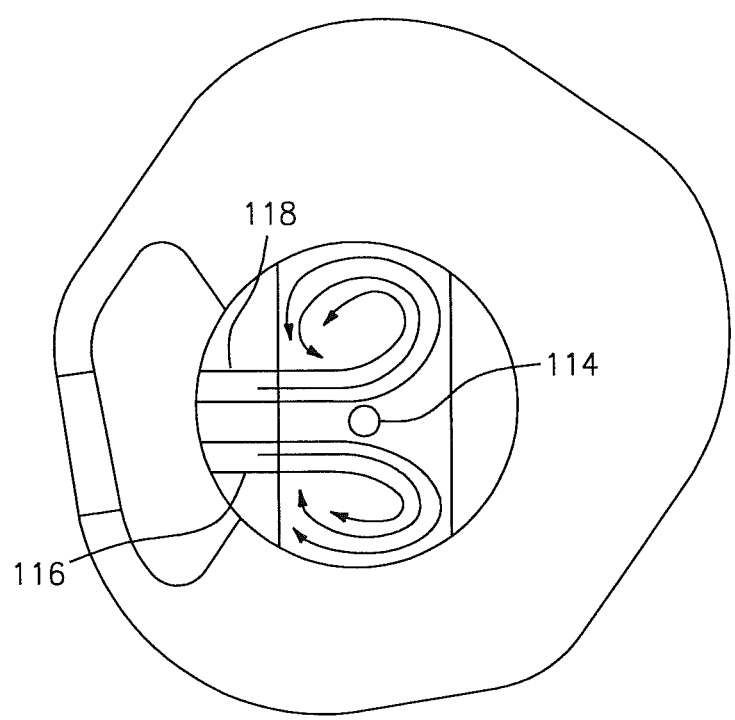
FIG. 14 is a top schematic view of the cavity vortex swirl fuel injector illustrating a counter-rotating vortices flow.

The secondary airflow passes through the airflow passages 116, 118 into the fuel injector cavity 128 transverse to the fuel aperture 114 to impinge upon the fuel jet from the fuel aperture 114 and generate counter-rotating vortices in the fuel injector cavity 128 (FIG. 14). The first airflow passage 116 defines a first vortices that impinges an edge of the fuel jet from the fuel aperture 114 and rotates counter-clockwise while the second airflow passage 118 defines a second vortices that impinges an edge of the fuel jet from the fuel aperture 114 and rotates clockwise. That is, the spacing of the air-streams maximizes the scrubbing on the fuel jet column when the fuel is injected to form a cavity vortex swirl fuel injection and thereby atomize the fuel.

The fuel jet from the fuel aperture 114 remains generally undisturbed so high fuel jet high penetration is preserved to achieve a desired tradeoff between stability and efficiency. The steady air jets from the airflow passages 116, 118 govern scrubbing of the fuel jet so fuel stripping is not dependent on the fuel flow rate. The augmentor section 30 is thus stable over a large range of operational conditions within minimal fuel usage. Efficient atomization of the fuel jet adjacent to the exterior surface 125 of the augmentor vanes 56 also anchors the flame and increase flame stability to reduce dynamic instability (e.g. screech). A reduction in screech facilitates a recovery of augmented thrust and potentially expands an aircraft operating envelope.

Figure 15:
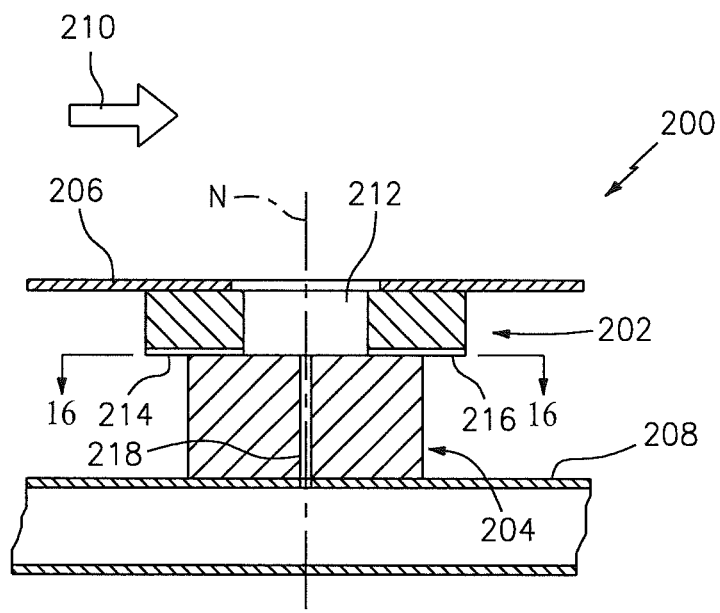
FIG. 15 is a sectional schematic view of a cavity vortex swirl fuel injector according to another disclosed non-limiting embodiment.

It should be appreciated that although described with respect to the augmentor section 30 of a low bypass turbofan engine, the cavity vortex swirl fuel injectors 90 may be utilized in other systems and engine architectures such as for direct fuel injection in a main gas turbine combustor section or a ramjet engine architectures. For example, with reference to FIG. 15, a cavity vortex swirl fuel injector 200 may be schematically represented by a wear block 202 and a nozzle 204 between an interface surface 206 and a fuel conduit 208.

The wear block 202 is mounted adjacent to the interface surface 206 that interacts with an airflow path 210 into which fuel is to be injected. The nozzle 204 is mounted adjacent to the wear block 202 to communicate fuel from a fuel conduit 208 into a fuel injector cavity 212 thence the airflow path 210.

The wear block 202 defines the fuel injector cavity 212 to allow airflow to surround and atomize a fuel jet from the nozzle 204. The fuel injector cavity 212 may be generally circular shaped or U-shaped that extends along the injector axis N arranged generally perpendicular to the airflow path 210. It should be appreciated that various other shapes may alternatively be utilized.

Figure 16:
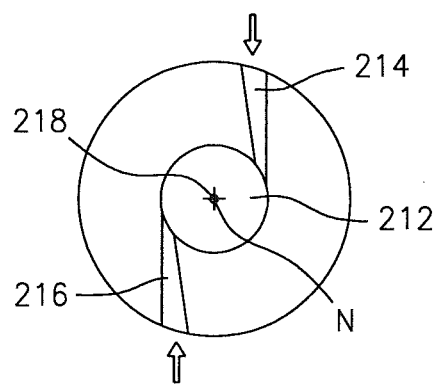
FIG. 16 is a top schematic view taken along line 16-16 in FIG. 15 to illustrate one disclosed non-limiting embodiment of the airflow passages in the cavity vortex swirl fuel injector.

In the cavity vortex injector concept, the wear block 202 includes two inboard facing airflow passages 214, 216 that communicates with a nozzle passage 218. That is, the airflow passages 214, 216 direct a secondary airflow (FIG. 16) transverse to the injector axis N and the nozzle passage 218. It should be appreciated that the injector axis N need not coincide with the nozzle passage 218. Air pressure within the interface surface 206 is greater than the air pressure external to the interface surface 206 such that the airflow passages 214, 216 inject a high velocity stream of air from the higher pressure to lower pressure regions. The airflow passages 214, 216 thereby define a cavity vortex.

The fuel injector cavity 212 may be sized and arranged to a given air stream velocity from the airflow passages 214, 216 to generate counter rotating vortices that scrub the fuel jet and enhance stripping of fine droplets and enhance the fuel atomization from the fuel jet to improve flame stability.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments to generate various means to interact the air stream intentionally with the fuel jet to enhance atomization of the fuel.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An augmentor section for a gas turbine engine comprising:
   a tubular case;
   a center body within the tubular case;
   an augmentor vane extending radially through an exhaust gas path of the gas turbine engine from the tubular case to the center body;
   a spraybar mounted within said augmentor vane; and
   a fuel injector mounted to said spraybar to communicate through said augmentor vane, wherein said fuel injector is configured to generate counter-rotating vortices;
   wherein the fuel injector comprises a first wall and a bottom wall transverse and perpendicular to the first wall, the first wall and the bottom wall at least partially form a fuel injector cavity, a first airflow passage and a second airflow passage extend through said first wall, and a fuel injection aperture extends through said bottom wall.

2. The augmentor section as recited in claim 1, wherein the fuel injection aperture is configured to inject a fuel jet, and said first airflow passage and said second airflow passage are transverse to said fuel jet.

3. The augmentor section as recited in claim 2, wherein said first airflow passage and said second airflow passage are arranged upstream of said fuel injection aperture with respect to the exhaust gas path.

4. The augmentor section as recited in claim 1, wherein said fuel injector is arranged at about ninety degrees with respect to the exhaust gas path.

* * * * *